United States Patent [19]

Nicholls

[11] Patent Number: 4,519,481
[45] Date of Patent: May 28, 1985

[54] SUSPENSION STRUT FOR VEHICLES

[75] Inventor: Lawrence G. Nicholls, Birmingham, England

[73] Assignee: Lucas Industries Limited, Birmingham, England

[21] Appl. No.: 517,562

[22] Filed: Jul. 27, 1983

Related U.S. Application Data

[63] Continuation of Ser. No. 267,535, May 29, 1981, abandoned.

[30] Foreign Application Priority Data

Jun. 3, 1980 [GB] United Kingdom ............... 8018066
Oct. 22, 1980 [GB] United Kingdom ............... 8034082
Apr. 14, 1981 [GB] United Kingdom ............... 8111747

[51] Int. Cl.³ .............................................. F16F 9/36
[52] U.S. Cl. .................................. 188/322.17; 267/126
[58] Field of Search ........... 188/269, 314, 315, 322.16, 188/322.17, 322.21; 267/118, 126, 136, 64.11, 64.15

[56] References Cited

U.S. PATENT DOCUMENTS

| | | | |
|---|---|---|---|
| 2,939,696 | 6/1960 | Tuczek | 267/64.15 |
| 2,943,711 | 7/1960 | Rossman | 188/322.17 |
| 2,977,111 | 3/1961 | Tuczek | 267/64.15 |
| 3,372,776 | 3/1968 | Avner et al. | 188/322.17 X |
| 3,771,629 | 11/1973 | Fader et al. | 188/322.17 |
| 3,797,615 | 3/1974 | Stembridge | 188/315 X |
| 3,958,673 | 5/1976 | Allinquant et al. | 188/315 X |
| 3,993,294 | 11/1976 | Wossner et al. | 267/64.15 |
| 4,030,716 | 6/1977 | Freitag | 188/269 X |

FOREIGN PATENT DOCUMENTS 2807391 8/1978 Fed. Rep. of Germany ........................ 188/322.17
649794 1/1951 United Kingdom ................ 188/269

Primary Examiner—George E. A. Halvosa
Attorney, Agent, or Firm—Scrivener Clarke Scrivener and Johnson

[57] ABSTRACT

A suspension strut for a vehicle comprises a cylinder in which works a piston, and the piston is carried by a piston-rod which passes through an axial extension depending from a closure for one end of the cylinder. An annular chamber defined between the cylinder and the extension accommodates the whole of a volume of gas or air and a portion of a volume of hydraulic fluid which fills the remaining space in the cylinder and against which the piston works. A seal through which the piston-rod works is carried by the extension at a position which is always below the level of hydraulic fluid in the cylinder so that the gas or air is prevented from escaping past the seal by the presence of the hydraulic fluid.

4 Claims, 7 Drawing Figures

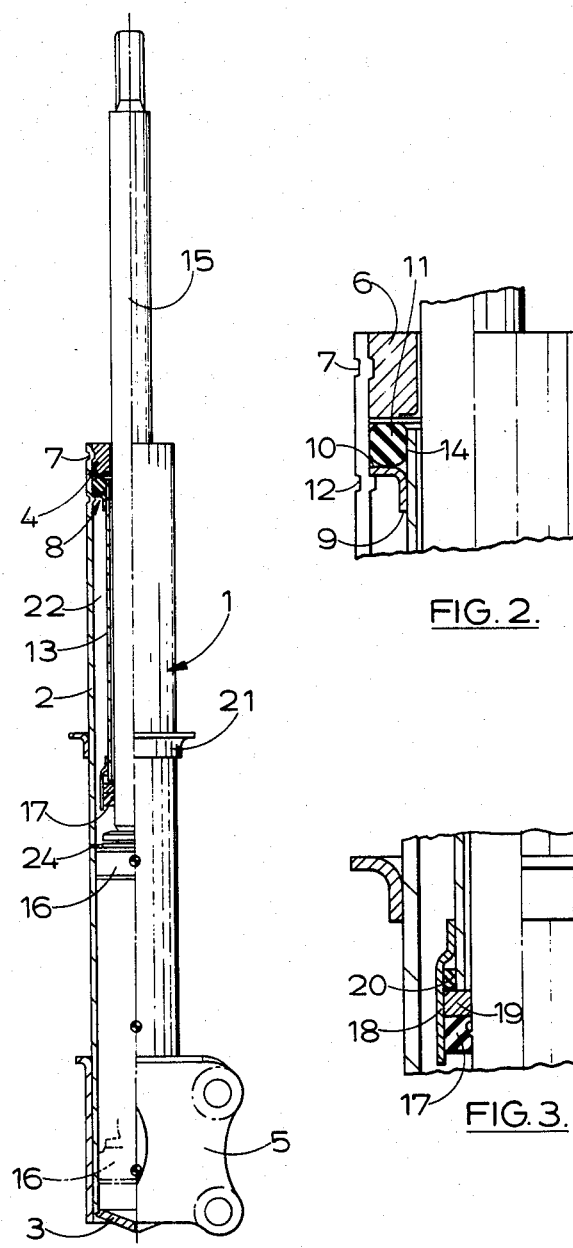

SUSPENSION STRUT FOR VEHICLES

This application is a continuation of application Ser. No. 267,535, filed May 27, 1981, now abandoned.

This invention relates to improvements in suspension struts for vehicles of the kind in which a piston adapted to work in a cylinder is carried by a piston-rod which passes through a closure for one end of the cylinder and volumes of gas or air and hydraulic fluid under pressure are retained within the cylinder, the piston being provided with at least one valve or restrictor which permits a limited flow of hydraulic fluid past the piston in both directions in response to relative movement between the cylinder and the piston, and the volume of gas or air is adapted to support at least a part of the load on the vehicle and to accommodate fluid displaced within the cylinder by the volume of the entering piston-rod.

Suspension struts of the kind set forth may act as dampers to damp out oscillations between parts of a vehicle which are relatively movable against the loading of suspension springs. The suspension springs may be separate from such dampers, or they may be combined into assemblies with such dampers.

In suspension struts of the kind set forth it is a problem to provide a seal between the piston-rod and the cylinder which is effective to prevent the escape of the gas or air from the cylinder.

According to our invention in a suspension strut of the kind set forth the closure through which the piston rod extends is provided with a cylindrical extension extending axially into the cylinder and an annular chamber defined between the cylinder and the extension accommodates the whole of the volume of gas or air and a portion of the volume of hydraulic fluid, a seal through which the piston-rod works being carried by the extension at a position which is always below the level of the hydraulic fluid in the cylinder, irrespective of the position of the piston within in the cylinder.

Since the volume of gas or air is trapped in the annular chamber above the level of the hydraulic fluid, the gas or air is prevented from escaping past the seal by the presence of the hydraulic fluid, and the seal is immersed in the hydraulic fluid which acts as a lubricant to reduce friction between the piston-rod and the seal.

The gas or air and the hydraulic fluid phases may be in direct contact or they may be separated by a floating piston of annular outline which is located in the annular space and carries sealing rings in its inner and outer edges for sliding sealing engagements with the extension and the cylinder at locations above the seal through which the piston rod works.

Preferably a second low pressure seal or dirt excluding member is housed in the closure adjacent to its outer end and through which the piston rod works in order to prevent the ingress of dirt and or foreign material into a space between the extension and the piston rod.

Some embodiments of our invention are illustrated in the accompanying drawings in which:

FIG. 1 is a longitudinal section of a suspension strut of the mono-tube type;

FIG. 2 is a view on an enlarged scale of the upper end of the strut;

FIG. 3 is a view on an enlarged scale of the lower end of the extension;

Figure 4:
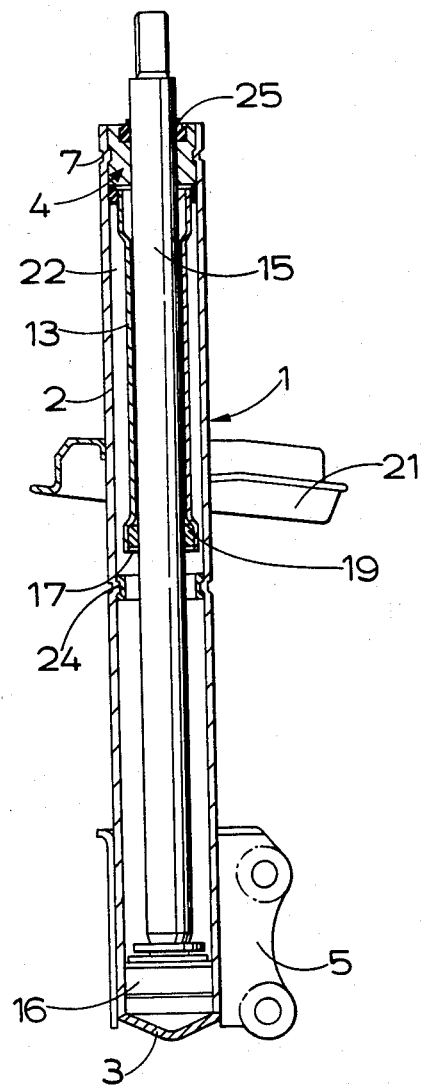
FIG. 4 is a longitudinal section of a similar suspension strut.

The mono-tube strut illustrated in FIGS. 1 to 3 of the drawings comprises a cylinder 1 in the form of a unitary cylindrical member 2 which is closed at its lower end by a closure 3 and at its upper end by a closure assembly 4. A bracket 5 fixed to the cylinder 1 at that lower end is adapted to carry a wheel (not shown).

The closure assembly 4 comprises an end plug 6 which is secured in position by a first radial rib 7 pressed inwardly from the wall of the member 2, a separate support 8 comprising a cylindrical portion 9 which depends from a radial flange 10, and an annular seal 11 clamped between adjacent faces of the plug 6 and the flange 10 by the abutment of the opposite face of the flange 10 with a second radial rib 12 spaced axially from the first rib 7. A cylindrical extension 13 of substantial length is carried by the cylindrical portion 9 from which it projects in opposite directions with the seal 11 also sealing against an upper portion 14 of the extension which is spaced by a small distance from the plug 6.

A piston-rod 15 projects through an opening in the plug 6 and the bore of the extension 13 into the interior of the cylindrical member 2 and carries, at its lower free end, a piston 16 which, in turn, works in the bore of the cylindrical member 2. The piston-rod 15 works through an elastomeric seal 17 at the free inner end of the extension 13. The seal 17 is retained within a portion of a cylindrical retainer 18 which extends beyond the inner end of the extension 13 which is of increased diameter and the seal 17 is supported by a support ring 19 mounted between the retainer 18 and the free end of the extension 13. The support ring 19 may be of a material, such as a synthetic plastics material, suitably P.T.F.E., which has a good bearing performance, although it does not function as a bearing. The ring 19 acts to prevent extrusion of the material of the seal 17. A sealing ring 20 of elastomeric material is also housed between retainer 18 and the adjacent face of the extension 13.

The piston 16 is of known construction and is provided with oppositely acting one-way valves or restrictors.

The piston-rod 15 is secured at its upper end to a part of the chassis of frame of the vehicle.

Substantially the whole of the load on the wheel is supported by a suspension spring (not shown) which surrounds the cylindrical member 2 and abuts at its lower end against a flange 21 on the cylinder 1, and a complementary abutment on the piston rod 15. A small proportion of the load is supported by a volume of gas or air under pressure in a pressure chamber 22 within the cylinder 1 and which is defined by the annular space between the closure assembly 4, the member 2 and the extension 13. The remainder of the interior of the cylindrical member 2 is filled with hydraulic fluid to a level well above the height of the elastomeric seal 17 at the lower end of the extension 13.

Relative axial movement between the chassis or frame of the vehicle causes oscillations in the suspension spring to occur. These oscillations are damped out by relative axial movement between piston 16 and the cylindrical member 2 with the piston 16 working against the hydraulic fluid due to resistance to flow through the piston 16 by the one-way valves or restrictors in the piston 16.

The volume of the entering piston-rod 15 is accommodated by, and causes further pressurisation of, the gas or air.

Arranging for the elastomeric seal 17 to be located below the level of the hydraulic fluid ensures that the gas or air is separated from the seal 17 by the fluid. This means that the gas or air is prevented from escaping by the fluid itself.

In order to protect the seal 17 from damage by inpact from the piston 16, a radial stop 24 is housed in the cylindrical member 2 to limit movement of the piston 16 towards the seal 17.

In the modified construction illustrated in FIG. 4 the piston-rod 15 also works through a low-pressure elastomeric seal 25 housed in the plug 6 and which acts to prevent dirt or other foreign material from entering the space between the piston-rod 15 and the extension 13.

Figure 5:
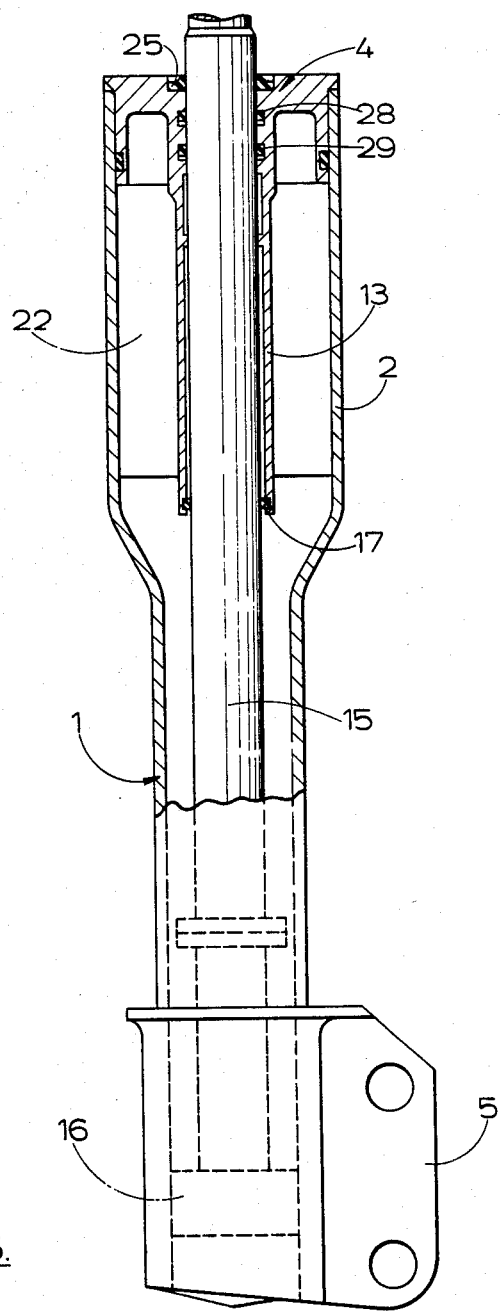
FIG. 5 is a longtitudinal section through another suspension strut.

In the modified construction illustrated in FIG. 5 the extension 13 is integral with the plug 6 and the piston-rod 15 also works through two further seals 28 and 29 provided in the closure assembly 4 adjacent to its outer end but inboard of the seal 25.

In the constructions described above emulsification of the hydraulic fluid can take place.

Figure 6:
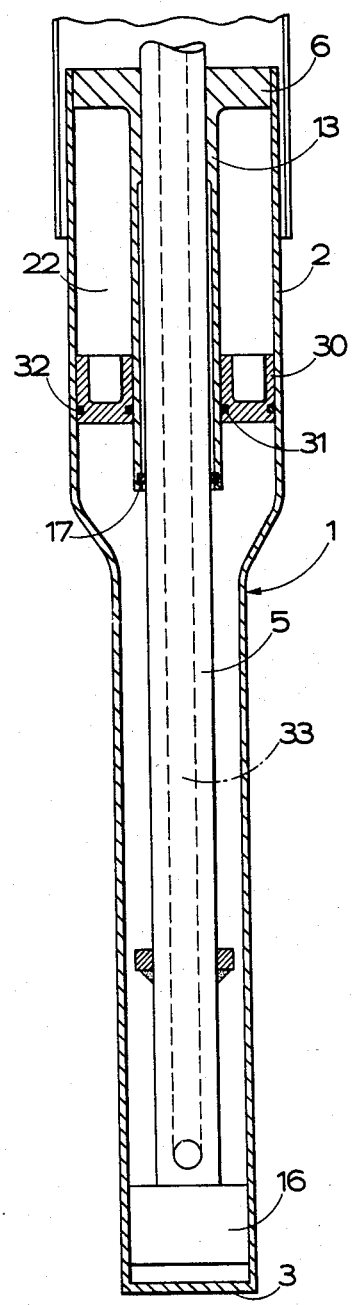
FIG. 6 is a longtitudinal section through yet another suspension strut.

In a modified strut illustrated in FIG. 6 of the drawings a separator in the form of a floating piston 30 is provided to separate the gas or air from the liquid phase. In this a construction the floating piston 30 is of annular outline and has sealing rings 31, 32 located in its inner and outer edges to seal, respectively, against the adjacent inner faces of the cylindrical member 2 and the extension 13 which is, integral with the plug 6. The pressure chamber 22 is defined in the member 2 between the piston 30 and the plug 6.

The volume of fluid within the strut can be adjusted to alter the effective length of the strut to compensate for changes in the loading on the vehicle. This is acheived by making the piston-rod 15 hollow to permit hydraulic fluid to be pumped through it and into the cylinder through a longititudinal bore 33.

Figure 7:
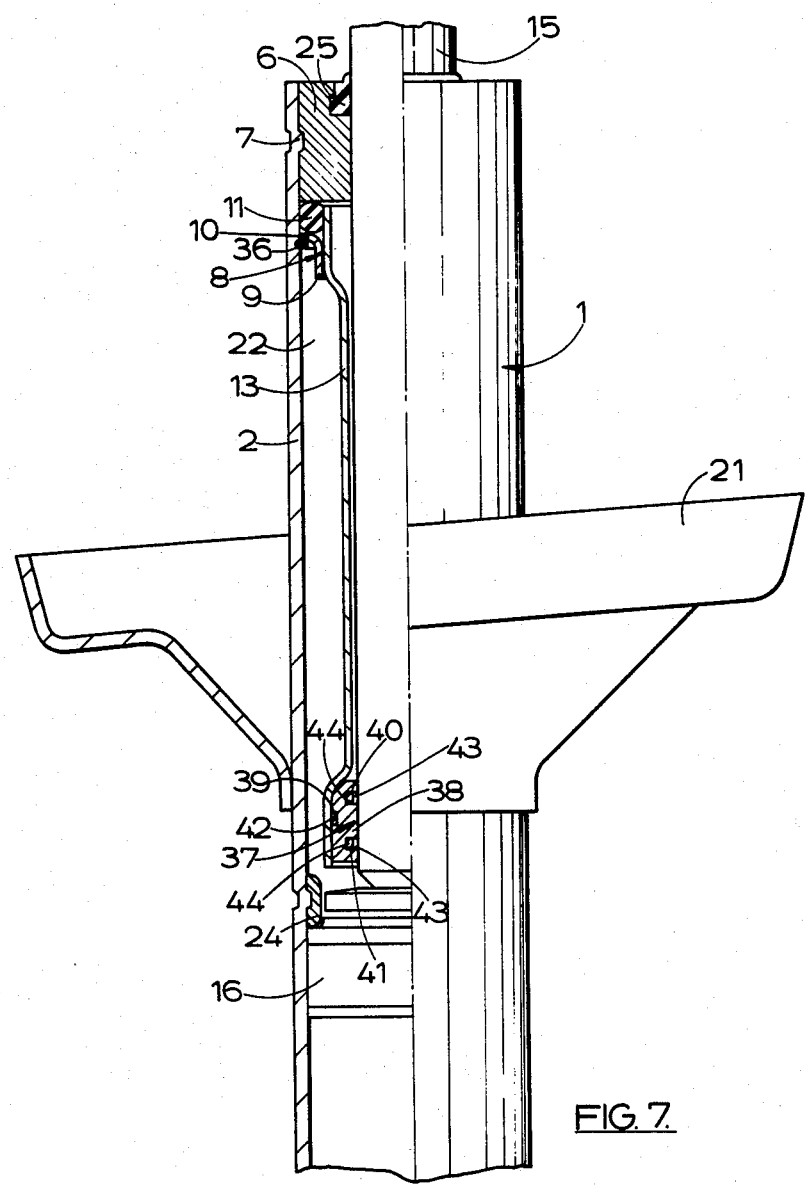
FIG. 7 is a longitudinal section of the upper portion of yet another suspension strut.

In the suspension strut illustrated in FIG. 7 of the drawings the extension 13 is clamped against the closure 6 by means of a circlip 36, and the low-pressure seal 25 is of the "wiper" type. The free inner end of the extension 13 carries a seal assembly 37 through which the piston rod 15 works. As illustrated the seal assembly 37 comprises an annular carrier 38 of a non-scuffing material, suitably nylon. The carrier 38 is formed in its outer peripheral edge with a single radial groove 39, and in its inner peripheral edge with axially spaced radial grooves 40 and 41. The groove 39 contains a sealing ring 42 of elastomeric material to form a seal against the retainer 18, which is integral with the remainder of the extension 13, and each groove 40 and 41, contains a sealing ring 43 of synthetic plastics material, suitably P.T.F.E., which is biased into sealing engagement with the rod 15 by means of a ring 44 of elastomeric material engaging between its inner face and the base of the groove 40, 41. Providing sealing rings 43 of P.T.F.E. minimises running friction.

The construction and operation of the strut of FIG. 7 is the same as that of FIG. 4 and corresponding reference numerals have been applied to corresponding parts.

I claim:

1. A suspension strut for a vehicle comprising a cylinder having an inner wall and an outer wall, a piston adapted to work in said cylinder in sliding engagement with said inner wall, a piston-rod carrying said piston, a closure for one end of said cylinder and through which said piston-rod passes into said cylinder, a volume of gas or air and a volume of hydraulic fluid retained within said cylinder, restrictor means in said piston to permit a limited flow of fluid past said piston in both directions in response to relative movement between said cylinder and said piston, and said volume of gas or air is adapted to support at least a part of the load on the vehicle and to accommodate hydraulic fluid displaced within said cylinder by volume of the entering piston-rod, wherein said closure through which said piston-rod extends comprises a plug of annular outline received in said cylinder at said one end, and a cylindrical extension separate from said plug, said plug having a cylindrical outer face co-operating with said inner wall of said cylinder, a cylindrical inner face openly spaced from said piston rod, and a planar radial end face interconnecting said cylindrical inner and outer faces at the inner ends thereof, means for retaining said plug in said cylinder at said one end, and said cylindrical extension depends axially into said cylinder, is spaced radially from said cylinder for the whole of the axial length of said extension between inner and outer ends thereof, and has an inner wall and an outer wall, and an annular space defined between said inner wall of said cylinder and said outer wall of said extension accommodates the whole of said volume of gas or air and a portion of said volume of hydraulic fluid, and wherein said outer end of said extension is adjacent to and axially located inwardly of said planar radial end face of said plug, and said extension is provided adjacent to said plug with an outwardly directed radial flange, a first seal through which said piston-rod works being carried by said extension at a position which is always below the level of said hydraulic fluid in said cylinder, irrespective of the position of said piston within said cylinder, and an annular second seal being disposed at the end of said annular space which is adjacent to said plug and being located adjacent to said plug, in engagement with said radial flange, said annular second seal being trapped between said inner wall of said cylinder and said outer wall of said extension and having sealing engagement with said inner wall of the cylinder and said outer wall of the extension, said second seal providing the sole sealing means between said extension and said cylinder.

2. A suspension strut as claimed in claim 1, wherein said second seal comprises an elastomeric seal.

3. A suspension strut as claimed in claim 1, wherein a third seal is provided, and said first and third seals are spaced axially from each other, both said first and third seals being disposed in positions which are always below said level of said hydraulic fluid.

4. A suspension strut as claimed in claim 1, wherein said volumes of gas or air and hydraulic fluid are in direct contact.

* * * * *